United States Patent [19]

Lim et al.

[11] 4,086,187

[45] Apr. 25, 1978

[54] ATTRITION RESISTANT ZEOLITIC CATALYST

[75] Inventors: John Lim, Anaheim; Dennis Stamires, Newport Beach, both of Calif.

[73] Assignee: Filtrol Corporation, Los Angeles, Calif.

[21] Appl. No.: 696,889

[22] Filed: Jun. 17, 1976

[51] Int. Cl.² .............................................. B01J 29/06
[52] U.S. Cl. ................................................. 252/455 Z
[58] Field of Search ................................... 252/455 Z

[56] References Cited

U.S. PATENT DOCUMENTS

| | | | |
|---|---|---|---|
| 3,557,024 | 1/1971 | Young | 252/455 Z |
| 3,609,103 | 9/1971 | Gladrow et al. | 252/455 Z |
| 3,624,003 | 11/1971 | Conde et al. | 252/455 Z |
| 3,972,835 | 8/1976 | Hoffman et al. | 252/455 Z |

*Primary Examiner*—Carl F. Dees
*Attorney, Agent, or Firm*—Subkow and Kriegel

[57] ABSTRACT

Attrition resistant zeolitic catalysts containing silica, alumina and clay components.

11 Claims, 3 Drawing Figures

ATTRITION RESISTANT ZEOLITIC CATALYST

BACKGROUND OF THE INVENTION

This invention relates to catalysts useful in catalytic hydrocarbon conversion operations, such as cracking. One type catalyst employs as a catalytic component aluminosilicate zeolite having an X-ray diffraction pattern similar to that of the zeolites with the structure faujasite. (See, for example, the Milton Patent U.S. Pat. No. 2,882,244 and the Breck U.S. Pat. No. 3,130,007). In the catalysts which incorporate such zeolites, the alumino-silicate zeolite is exchanged usually with a polyvalent cation, such as an alkaline earth or a rare-earth cation. In the usual case, such zeolites have been mixed with a matrix. The matrix as used or suggested in the prior art includes alumina, hydrated alumina, such as pseudoboehmite, clays and treated clays, such as acid-treated clays and silica, such as silica gel and colloidal silica sols.

An example of such catalyst is a composite of hydrated alumina, an acid-treated clay, and a material identified as silicated clay in U.S. Pat. No. 3,446,727 which has been exchanged with magnesium and rare-earth cations. The so-called silicated clay may be produced with $Al_2O_3:SiO_2$ ratios of from 1:2 to 1:6. The clay which is converted may be either the acid-treated clay or kaolinite which has been calcined to destroy its X-ray crystallinity. The X-ray pattern of the silicated clay has peaks which are similar to those found in the faujasite X-ray diffraction pattern. All of the foregoing alumino-silicates are herein referred to as zeolites of the faujasite type.

The zeolite catalysts referred to above are unstable when subjected to high temperatures, particularly in the presence of steam. Their catalytic activity is reduced rapidly.

The cracking process operates at two levels of temperature. The catalyst is in contact with hydrocarbon vapor to be converted at a relatively high temperature. In this process, the catalyst becomes contaminated with carbon and high-boiling hydrocarbon. In order to remove the contaminants, the catalyst is subjected to regeneration before it is returned to the cracking zone. The catalyst is purged with steam to remove hydrocarbon vapors and introduced into a regeneration zone where the carbon and hydrocarbons in the catalyst are burned by hot air introduced into the regeneration zone. The regeneration temperature is many degrees higher than the reaction temperature. The regenerated catalyst is returned to the reaction zone. The zeolite component of the prior art catalysts loses a substantial portion of its crystallinity and activity under these conditions.

In order to test the activity of the catalyst, it is the practice in the catalytic-cracking art to measure the catalyst activity by a bench-scale test. Various tests have been accepted by the cracking art. An early and widely used test was the Cat A Test. (See U.S. Pat. No. 3,446,727.)

More recently, an activity test known as the microactivity test has been adopted. (See Oil and Gas Journal, 1966, Vol. 64, No. 39, pp. 7, 84, 85; and Nov. 22, 1971, pp. 60–68.)

When the "high activity" catalysts were originally developed, the cracking and regeneration temperatures were at a level which permitted the use of these catalysts. (See U.S. Pat. No. 3,446,727.) More recently, the regeneration step required higher temperature conditions. These thermal conditions are so severe that a catalyst of improved stability is required. The "high-activity" catalysts of the prior art referred to above are deactivated in a substantial degree when subjected to these more severe conditions.

In order to test the thermal stability of the catalyst and, therefore, its resistance to the high temperature and steam conditions encountered in commercial cracking opertions, it is subjected to high-temperature steam treatment prior to being subjected to the bench-scale tests. Originally, when the catalysts were regenerated under conditions of moderate severity, the catalysts were tested by subjecting them to steam at 1350° F. for 4 hours. (See U.S. Pat. Nos. 2,035,463 and 3,446,727.) Subsequently, the temperature of the steaming was increased to 1450° F. for two hours. This method is referred to in this specification as M Steaming. As the regenerator temperature of the chemical cracking process became more severe, it was found that the temperature of steaming prior to testing should be increased to 1500° F. for 2 hours (S steaming) in order for the bench-scale test to give results which would be commercially meaningful.

To be representative of the still higher regeneration temperatures of modern catalytic cracking units, the steaming conditions are made even more severe. A temperature of 1550° F. for 2 hours (S+ steaming) prior to testing for catalysts was found to be more nearly representative of the effect of the regeneration operations in these more modern cracking operations. This steam pretreatment is referred to in this application as S+ steaming.

As is more fully shown below, zeolite catalysts of the faujasite type when subjected to S+ steaming are substantially inactive.

While we do not wish to be bound by any theory of why this is so, we note that when these catalysts are subjected to heat and steam in regeneration during a commercial cracking operation, their X-ray diffraction pattern shows a substantial modification of the peaks characteristic of faujasite.

The prior art has formulated such catalyst from zeolites, such as sodium zeolites of the faujasite type which have been exchanged with ammonium hydroxide or polyvalent cations, such as magnesium, rare earth or several thereof. Such exchange process is carried out. Such catalysts have been used in cracking of petroleum fractions. These include the so-called fixed-bed systems in which the cracking reaction and the regeneration are carried out in alternate stages without moving the catalyst. One system is the moving-bed type in which the catalyst mass moves continuously in cycles of operation from the reaction zone to the regeneration zone and returns to the reaction zone. Catalysts used for these systems are of substantial size, such as cylindrical pellets of, for example, 3/16 to ¼ inch length and 3/16 inch in diameter.

A widely used process is the fluid catalytic cracking process. In this process, the catalyst is in the form of fine particles, for example, 20–80 micron diameter in microspheres. These are formed by spray drying water suspensions of the catalyst components. In the fluid catalytic cracking process, these microspheres are suspended in the hydrocarbon vapors in "dense" phase under cracking conditions. The hydrocarbon steam passes to a disengaging zone. Catalysts which are separated from the vapors are returned to the "dense" phase. The separated vapors are passed to the fractionation device. Spent catalyst passes to a steam-stripping section for removal of hydrocarbons. It is then transferred by carrier steam to the regeneration zone. The carbon and hydrocarbon contaminants in the spent catalyst are removed by combustion with hot air. The regenerated catalyst is returned to the reaction zone. The combustion gases are exhausted through a cyclone or electrostatic collectors.

In this process, the catalyst particles encounter excessive abrasion as they collide with each other and with the walls of the apparatus. Excessive loss of catalyst in the effluent gases is encountered. Important, also, from an environmental standpoint is the discharge of particles to the air resulting from an inefficient operation of the catalyst separating devices.

The friability of the catalysts when used in the fluid catalytic operations is a disadvantage. It requires replenishment of the catalyst to make up for the loss due to attrition of the catalyst and causes a variation in the space velocity, and thus in the rate of the conversion.

In order to rate catalysts according to their attrition resistance for use in fluid catalyst cracking process, a bench-scale test has been devised and has been used in this art. It has been accepted by the industry as a suitable measure of the abrasion resistance of spray-dried fluid catalyst particles. This test simulates the fluid-cracking process attrition conditions although operating under ordinary room temperature. It measures the rate of weight loss in a sample of microspheres under test which is lost in the effluent gases.

Figure 1:
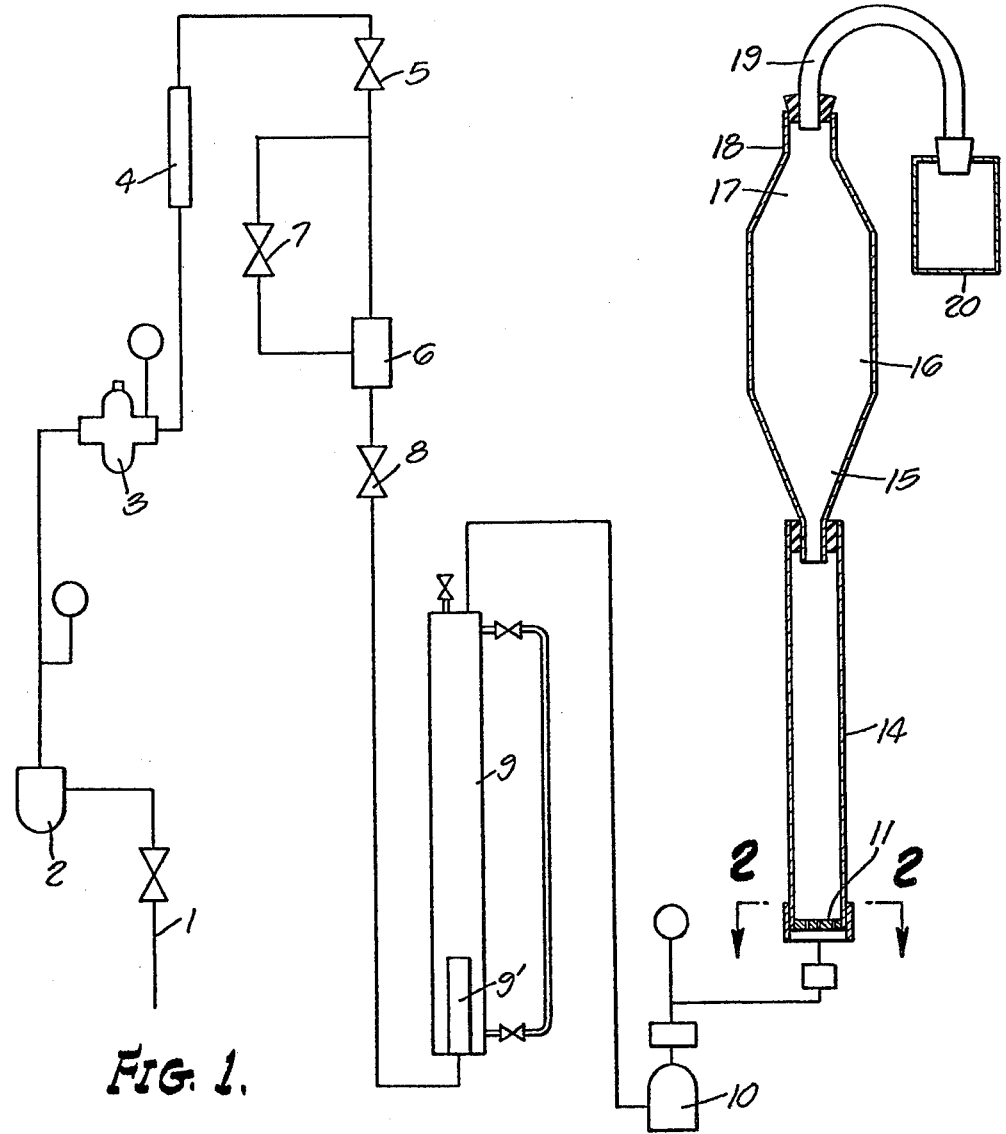
FIG. 1 is a schematic flow diagram of the test apparatus.
Figure 2:
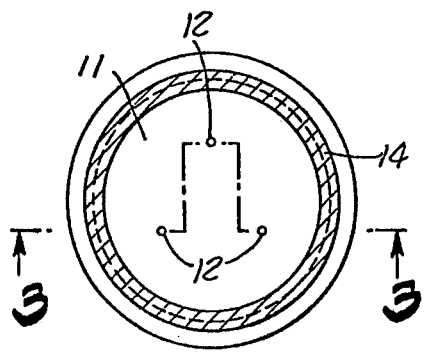
FIG. 2 is a section taken on line 2—2 of FIG. 1.
Figure 3:
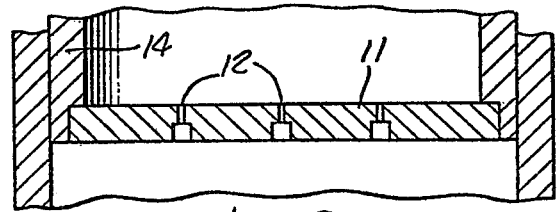
FIG. 3 is a section taken on line 3—3 of FIG. 2.

The apparatus is shown in FIGS. 1, 2, and 3.

An air supply 1 is connected to a filter 2 and to a pressure regulator 3, flow meter 4 and to the humidifier 9 through valve 5, regulator valve 7, flow controller 6 and valve 8. The air passes from the humidifier through a mist eliminator 10 and through symetrically spaced bores in a 3/16 inch radius, 18 inch thick plate 11. The counter bores 12 on the entry side are 1/16 inch diameter and 1/16 inch deep. On the exit side, the holes are 0.0150+ 0.0002 inch in diameter and 1/16 inch deep. The dense phase thin-walled stainless steel tube 14 is 1½ inches I.D. and 28⅜ inches in length. The disengaging space is formed of a conical section 15 of zeolites 9¾ inches length, a cylindrical section 16 5½ inches in diameter and 11 inches in length, an upper conical section 17, 4 inches in length, an exit spout 28 of 2 inches length, an exit semicircular 1¼ inch glass tube 19 having a height measured from the top of 28 to the outer wall of the glass tubing of 4 inches. The glass tubing is connected to a porous bag 20.

THE CONDITIONS OF THE TEST

About 70 grams of the catalyst to be tested for attrition resistance are calcined at 1050° F. for 1 hour and, after cooling, screened through 150-mesh screen; the sample not passing through the screen is discarded. The screened sample is agitated in a 16-ounce plastic container with 10% by weight of water and shaken by hand for at least 5 minutes to break up the lumps and to distribute the water evenly. The wetted sample is placed in a humidifier at 100% relative humidity for at least 1 hour. 50 grams of the humidified fraction is introduced into the tube 14. Air at 27 psig and at the rate of 22.5 cubic feet per hour, to give a jet velocity at the holes of 1700 feet per second, is passed into the tube 14. The catalyst is tumbled in the dense phase, and fines are separated in the disengagement space in 15 and 16 and collected in the bag 20. The material in 20 is collected and weighed after 1 hour, after 3 hours, and after 5 hours. The weight in grams of the fines after 5 hours multiplied by 2 is herein referred to as the attrition index, to wit, the percent loss of the catalyst due to attrition.

The literature, both in patents and in the general publication, is full of descriptions of various components employing various matrixes, among which are included silica, derived from a silica sol which is combined with the zeolite. Examples of such sols employed with zeolite catalyst are the acid sols, such as are described in Kimberlin et al, U.S. Pat. No. 3,352,796. Other patents describe the use of silica gels and silica sols without specifying their composition and properties. An example of such patents is Plank et al, U.S. Pat. No. 3,140,249.

Commercially acceptable catalysts have abrasion indexes of 30 or more. Catalysts formulated from synthetically produced zeolite alumino silicates, such as those of the faujasite type have had attrition indexes substantially above 20%. The attrition indexes of various batches of catalysts produced different batches of zeolite and a matrix may vary over a wide range, for example 15% to 45%, with a standard deviation factor (1 sigma) of as much as 11.

The catalytic activity and steam stability of various batches of prior art catalyst may also vary of a wide range, for example, about 65 to about 80% conversion at M steaming conditions.

Part of the problem of producing catalysts of consistently similar and suitable abrasion indexes arises from the variability of the particles of the components used in commercially produced catalysts, for example, synthetically produced zeolites, clay and hydrated alumina.

It has been long the objective of the petroleum refining and the catalyst manufacturing industries to obtain such catalysts which would have abrasion indexes of 20% and desirably as low as possible without impairment of the catalytic activity and steam stability. If such catalysts could be produced consistently, that is, if the variables of the attrition index from batch to batch could be kept within reasonable limits, for example, the refiner could operate his conversion process at maximum efficiency and economy. Not only would there be a maximizing of the economic return, but an ecological plus as well.

STATEMENT OF THE INVENTION

It is an object of our invention to formulate a catalyst from a precursor mixture of an exchanged zeolite, hydrated alumina and clay which will have an improved attrition index, for example, a mean value of 20% or less, and a desirable high activity, steam stability, and increased pore volume.

It is an object of our invention to improve the abrasion resistance of the prior art catalyst formed from polyvalent exchanged zeolite of the faujasite type, a kaolin and pseudoboehmite by spray drying an intimate mixture of the aforesaid components.

It is a further object of our invention to improve the reproducibility of the process of forming such catalyst so that the resistance to abrasion of the various branches will be more closely the same than has been produced in the prior art.

We have found that we may obtain a substantial improvement in the resistance to abrasion of the formed catalyst particles by incorporating into the zeolite, clay, alumina mixture, and an ammonium polysilicate having the requisite properties.

Such polysilicates are produced by exchange of a sodium silicate solution with a hydrogen exchange resin to form the polysilicic acid. The polysilicic acid polymerizes rapidly into a sol of silica colloids whose molecular weight increases rapidly and may proceed to a semi-gel state.

We have found that the polysilicic acid which is suitable for our purpose is one which has a low sodium content and which is stabilized promptly after it is produced by addition of ammonium hydroxide to a basic pH.

We have also found that, to obtain the desired abrasion resistance and a relatively small variation of the abrasion resistance of various batches produced from such mixtures and also a suitably high activity and steam stability, the ammonium polysilicate solutions should have properties which we have found empirically to be desirable in the mixtures referred to above.

By employing a properly selected ammonium polysilicate and employing the silicate as an additive to prior art zeolite catalyst compositions, we have been able to produce a catalyst having a desirable abrasion resistance as measured by the above abrasion resistance test.

Many zeolite catalysts of the prior art, which show an excessive attrition loss in commercial fluid catalytic cracking, will have an attrition index of, according to this test, in excess of 30 with a wide variation in attrition index from batch to batch.

The catalysts of our invention have a mean attrition index of about 20% or less according to this test procedure and the variation in attrition index from batch to batch in the range of about 15% to about 25% with a 1 sigma of about 5 or less.

The catalyst of our invention is a four-component composition of zeolite of the faujasite type exchanged with a polyvalent cation and ammonium cation or one or more than one of such cations, a kaolin clay, alumina and silica formed from a precursor mixture of the exchanged zeolite, kaolin, hydrated alumina, and ammonium polysilicate, suitably and intimately mixed and spray dried.

This procedure differs from the prior art in that, to the mixture of the zeolite, clay, and hydrated alumina of the prior art, we have added silica produced from polysilicic acid as a fourth component. The addition of a suitably chosen polysilicic acid to the prior art catalyst compositions produces a catalyst of the low attrition index and high activity, and does so with suitable consistency from batch to batch.

The Zeolite Component

The zeolite used may be any of the zeolites which have been used in cracking catalysts, such as has been referred to above under the section "Background of the Invention."

Such alumino-silicates may be the faujasite-type zeolites previously referred to. We prefer to use and have used in the following examples the faujasite type, produced by silication of clays as described in U.S. Pat. No. 3,446,727. We prefer for use in the catalyst of high thermal stability of our invention such zeolites having $SiO_2/Al_2O_3$ molar ratios in excess of 3 and preferably above 4.

An example of the zeolitic alumino-silicate and its method of formation is described in Example 2 of U.S. Pat. No. 3,446,727. The $SiO_2/Al_2O_3$ molar ratio of the resultant alumino-silicate as produced by the process of the patent, by adjustment of the reaction conditions, may be increased to a ratio above 4. The usual content of sodium in the zeolites employed in these catalysts is less than 5% by weight expressed as $Na_2O$. By carrying the exchange further, the percent $Na_2O$ may be reduced to 2 or less. Catalysts have also been formed by exchanging with acid or ammonium salts to reduce the $Na_2O$ content of the zeolite. The conditions for exchanging zeolitic alumino-silicates are well known in the prior art.

In formulating our catalyst, we have used as typical of the zeolite catalyst a silicated clay produced according to Example 2 of the aforesaid U.S. Pat. No. 3,446,727. Instead of an acid-treated clay, we may use a kaolin which has been calcined sufficiently to destroy its crystallinity as evidenced by its X-ray pattern.

In order to obtain a faujasite-type zeolite having an $SiO_2/Al_2O_3$ ratio in excess of 4, we adjust the components to increase the $SiO_2$ to $Al_2O_3$ ratio in the reaction. The following is an example of the reaction composition produced from a mixture of sodium silicate, sodium hydroxide, and sodium chloride of composition expressed in mol percent as $SiO_2$, 5.27 mol %; $Na_2O$, 3.5 mol %; Cl, 1.7 mol %; the rest, water. The solution is mixed with calcined kaolin. The reaction temperature is held at about 60° to 75° F. for a period of about 4 days. The clay mixture, after this low temperature digestion step, is heated with live steam to about 190° F. until crystallization is complete, for example, 72 hours. The crystalline material is filtered and washed. The silicated clay had a $SiO_2/Al_2O_3$ net ratio of about 4.3 and 13.5% by weight of $Na_2O$ on a volatile free (V.F.) basis. The ratios and compositions given above are merely exemplary. Variation of the components and of the times and temperatures, as is usual in commercial operations, will produce silicated clay having $SiO_2/Al_2O_3$ mol ratios varying from about 4 to about 5. Zeolites with $SiO_2/Al_2O_3$ mol ratios above 5 may be obtained by increase of the $SiO_2$ in the reaction mixture.

The product shows an X-ray pattern containing peaks which correspond to the faujasite pattern.

The zeolite so produced contains Na ions in exchange position. The practice in this art is to employ exchanged zeolites produced by exchanging the sodium with polyvalent ions such as Ca, Mg, H and preferred in addition, with, or in place of such ions the rare earth ions such as cerium and lanthanum, as is described in said U.S. Pat. No. 3,446,727 and said U.S. Pat. No. 3,140,249.

The Pseudoboehmite Component

The hydrated alumina which we prefer to use includes a substantial proportion above 25% and preferably substantially entirely a gelatinous aluminum monohydrate AlOOH. The X-ray pattern of the pseudoboehmite shows a broad peak in the range of 10° to 18° peaking at 13.5° in a pattern produced from copper K alpha radiation. (For further details of the composition and crystal structure, see Karl Wafers and Gordon M. Bell, Technical Paper No. 19, Alcoa Research Laboratories, 1972, pp. 11 et seq.) The process of Example 1 of U.S. Pat. No. 2,935,463 is reported in said patent to produce a product containing a hydrated alumina gel, identified as boehmite and crystalline alumina trihydroxides. The gel type of boehmite is here identified as pseudoboehmite. We may produce a purer form of pseudoboehmite substantially free of crystalline trihydroxides by suitably modifying the procedure described in the above patent. Other types of pseudoboehmites are commercially available, such as hereinafter described. These forms are substantially free of crystalline aluminum trihydroxides.

Pseudoboehmites may be formed by other procedures. (See Technical Paper No. 19.) We prefer to employ a pseudoboehmite which is substantially free of Na cations.

The pseudoboehmite may contain crystalline trihydrate components such as bayerite, nordstrandite, and gibbsite. We prefer that the alumina contain at least 25% and, more preferably, 50% or more by weight of pseudoboehmite.

The alumina hydrate may be formed as described in U.S. Pat. No. 2,935,463 (See Example 1). The preferred pseudoboehmite is formed as described in the said patent with the following modifications. The ammonium alum crystals are formed from aluminum sulfate obtained by dissolving gibbsite [Al(OH)$_3$] metallurgical grade in sulfuric acid. The ammonium alum crystals are exchanged with 28% NH$_3$ in water for 30 minutes at about 100° F. The thickening and washing operation as described in the above patent is carried out at about 140°–180° by injection of steam. The alumina is washed to about 2–4% SO$_3$ based on the alumina volatile free. The resultant product, according to an X-ray spectrogram, is substantially all pseudoboehmite and contains a small fraction, perhaps about 5%, of a crystalline trihydroxide, to wit, bayerite. We refer to this alumina as Sample F. The spray-dried slurry is referred to as F-1.

The pseudoboehmite may occur mixed with crystalline aluminum trihydroxides, for example, the hydrated alumina produced as described in the aforesaid U.S. Pat. No. 2,935,463 which is defined in said patent as containing about 35% of the gelatinous monohydrate, boehmite, here identified as pseudoboehmite and also containing bayerite.

The pseudoboehmite may contain crystalline trihydrate components such as bayerite, nordstrandite, and gibbsite. We prefer that the alumina contain at least 25% and more preferably 50% or more by weight of pseudoboehmite.

The percentages may be determined from X-ray spectrograms. (See Harold King and LeRoy E. Alexander, "X-ray Diffraction Procedures," John Wiley & Sons, 1954, Section 7, pages 390–438.) While we do not wish to be bound by any theory of the action of the crystalline trihydroxides, they appear to be merely inert diluents.

The pseudoboehmite is improved for use in the composition by acidification (peptization), preferably with formic acid. One part by weight of pseudoboehmite calculated as volatile free was mixed with relatively mild agitation with about 1.0 parts by weight of a water solution containing about 1 to 1.5% by weight of formic acid per gram of solution for 30 minutes with vigorous agitation. The addition of the acid in amounts greater than about 3% by weight of acid results in impairing the utility of the pseudoboehmite as a component in the catalyst of our invention. Other peptizing agents, such as HNO$_3$, phosphoric acid, and acetic acid of like hydrogen ion concentration may be used.

We have found that in order to obtain an alumina which has the function of improving the attrition resistance of the catalyst it should have a measurably substantial amount of material which is dispersible in water, either as a soluble compound or as a colloid. In order to rate the aluminas for our purpose, we find preferably that an alumina should have a high peptizability index and be substantially free of sodium. The details of the peptizability test procedure are described below. We find that the crystalline trihydroxides show less than 0.5% peptizable component.

The hydrated alumina which we prefer to use has a high "peptizability index," preferably above 0.5%. We have employed the following procedure in selecting the pseudoboehmite which is peptizable for purposes of the catalyst of our invention.

Fifty milliliters of a slurry of alumina containing 6.3 grams Al$_2$O$_3$ is added to 100 ml of deionized water and 1 ml of concentrated formic acid. This mixture is stirred and then centrifuged for 5 minutes (1800 rpm average radius 6 inches). The supernatent liquid is decanted, evaporated to dryness, ignited at 1850° F. and weighed. The ignited weight expressed as percent of the original weight of the solids (ignited weight basis) is the peptizability index of the alumina. The pseudoboehmites are distinguished from the crystalline trihydroxides in that the latter in this test are substantially completely precipitated in the centrifuge.

The Polysilicate

The polysilicate component is formed from the exchange of sodium silicate with an acid exchange resin. This procedure is well known, as for example, see U.S. Pat. Nos. 3,083,167 and 3,649,556.

The polysilicic acid as produced in the exchange has a Na+ content of about 50 ppm or less and a pH of about 3 pH to about 3.6 pH and preferably about 3.3 to about 3.5 pH. It is desirable that the ammonium polysilicate solution be substantially free of Na. It is desirable that the Na+ content of the ammonia stabilized exchanged silica be as low as practical. A practically attainable and useful molar concentration ratio of Na+ to NH$_4$+ be in the range of about 1 mol of Na to about 25 × 10$^2$ mols of NH$_4$ to about 1.5 mols of Na+ to about 25 × 10$^3$ mols of NH$_4$ with the pH in the range of about 9 to about 11 preferred.

The silica content referred to as SiO$_2$ is from about 3% to about 12% based on the solution, preferably 5–6%.

This solution is promptly, as it is formed in the exchange, stabilized by the addition of concentrated ammonium hydroxide to a pH in the range of about 9 to about 11, preferably 9.5 to 10 pH.

The mol ratio of the SiO$_2$ to NH$_4$ is in the range of about 4 to about 14 indicating a polymer silicate anion containing about 4 to about 14 moieties expressed as [SiO$_2$] where $n$ is from about 4 to about 14.

The polymer is thus an ammonium polysilicate which is ionic.

Such solutions tend to polymerize to higher values of higher molecular weight polymer at a rate depending on the concentration of silica and the pH. Alkaline pH reduces the rate polymerization. We therefore desire to use a polysilicic acid which properly has been formed by the ion exchange that it be stabilized against polymerization by adjustment of the pH to a suitably high alkalinity, for example, a pH of about 9 to about 11 by NH$_4$OH.

The ammoniated polysilicic acid, which we have found preferable for the catalyst of our invention, has the following characteristics:

A sodium content expressed as a Na+ ion of less than about 80 parts per million, preferably less than about 50 parts per million, for example, less than about 20 parts per million based upon the weight of the solution; a silicate content expressed as $SiO_2$ of about 5% to about 6% of the weight of the solution, for example, and preferably about 5.5% by weight of the solution, which has a specific gravity of 1.04 to about 1.05, for example, 1.045 grams per cubic centimeter; a $p_H$ of the ammoniated solution of about 9 to about 10, for example, about 9.5%, as described above.

We believe the above facts are consistent with the view that the silicate component of the catalyst precursor employed in forming the catalyst according to our invention is a solution containing $NH_4+$ cations and polysilicate anions of low molecular weight with the major portion of the $SiO_2$ in the form of the aforesaid anion of said low molecular weight so as to distinguish it from a colloidal sol.

Wherever in this specification and claims we refer to ammonium polysilicate, we mean the ammonia stabilized polysilicic acid described above.

While the above guides are useful as rules for selection between various forms of the silicas for use in the catalyst of our invention as described herein, the final guide is the production of a catalyst which will have the desirable mean attrition index of 20% or less when measured by the above test procedure and will have an M conversion in volume % of about 70 or more at 1450° F., an S conversion of about 60 or more at 1500° F., and an S+ conversion of about 25 or more at 1550° F.

Such a catalyst may be formulated from the pseudoboehmite and ammonium polysilicate suitably selected to meet the selection rules described above.

The Clay Component

The catalysts of the prior art have included various additives which are referred to as matrix. They include crystalline materials, such as crystalline aluminum trihydroxides and clays or amorphous products, such as calcined kaolin or silica gels or composite gels, such as silica-alumina gels. While we do not wish to be bound by any theory of the usefulness of these so-called matrix materials, we believe that they improve the porosity of the catalysts. The increase in porosity aids in selectivity and regeneration of the catalyst which becomes contaminated with carbon and high-boiling hydrocarbons as a result of the cracking reaction. They are, however, dilutents which may not improve the catalytic activity.

We may use the acid-treated clays, such as described in said U.S. Pat. No. 3,446,727.

The preferred matrix for use in our catalyst is a kaolin clay. For purposes of improving the catalytic activity of the complex, we find that a plastic crystalline kaolin and kaolinite are preferred. Such crystalline kaolins include ball clay and halloysites.

We prefer for purposes of obtaining a catalyst of both high thermal stability and superior attrition resistance to employ a ball clay.

The Catalyst

The catalyst of our invention comprises a spray-dried mixture of a precursor water slurry of ammonium polysilicate, an alumina hydrate having a substantial content of pseudoboehmite, and a faujasite-type zeolite and clay.

The range of compositions of the aforesaid precursor and of the spray-dried catalyst of our invention on a volatile-free basis as set forth above includes the zeolite of the faujasite type in the range of about 10 parts by weight to about 30 parts by weight, alumina derived from peptized pseudoboehmite in the precursor slurry from about 10 parts by weight to about 30 parts by weight and $SiO_2$ derived from the polysilicate in the slurry from about 13 parts by weight to about 20 parts by weight; and from about 20 to about 50 parts, preferably in excess of 30 and preferably in excess of 40 parts by weight of kaolin, preferably such as ball clay, all adding to substantially 100 parts by weight. Separately prepared groups of spray-dried samples, each tested by the above attrition test, have but a relatively small spread of the individual value of the attrition index. For example, groups of samples of catalyst particles typically will have a mean attrition index of 20 or less; and 90% of a group of samples will have a variation of the mean of the measured attrition index of ± about 5 or less, i.e, 1 sigma of about 5 or less. This is a substantial improvement over similar catalysts prepared without the ammonium polysilicate.

Compared with a similar catalyst prepared without the ammonium polysilicate, the pore volume and the fraction of the pore volume in the range of 50 to 200 Angstroms will be substantially greater. Typically, catalyst of our invention will have a pore volume in excess of about 30 Angstroms; and the percent of the pores in the 50 to 200 Angstrom range will be above about 50%.

The thermal stability of the catalyst of our invention expressed as activity at S+ steaming at 1550° F. is substantially higher than that of a similar catalyst prepared without employing the ammonium polysilicate. Typically, the activity at S+ steaming will be substantially in excess of 20%.

EXAMPLE 1

The zeolitic alkali treated clay prepared as above after filtration is washed to a $p_H$ of 12.5 to form a slurry containing about 25% solids. Sulfuric acid is added to a $p_H$ of 3.5. The slurry is filtered, and the filter cake is slurried to a solid content of about 25%. The resultant slurry is reacted with rare earth sulfate solution as described in U.S. Pat. No. 3,446,727, without introducing other metallic cations, to form an exchanged zeolite of about 10–15% by weight of rare earth ions expressed as rare earth oxides based upon the zeolite content on a volatile-free basis. The slurry is filtered and washed substantially sulfate free and is reslurried to about 25% to 30% solids content. This slurry of exchanged zeolites is used in the following examples:

$Na_2O$ — 4.5% by weight
ReO — 12.0% by weight
$Al_2O_3$ — 26% by weight
Remainder silica ($SiO_2$)
ReO comprises about 60% $La_2O_3$ and about 40% $CeO_2$ by weight

EXAMPLE 2

The filter cake of the exchanged zeolite produced as in Example 1, washed sulfate free as above, is dried and calcined at about 800°–850° F. for approximately 30–45 minutes. It is cooled and then reslurried in water to about 25%–30% solids content. The slurry is again exchanged with rare earth sulfates as in Example 1. The exchanged slurry is filtered and washed sulfate free and then reslurried to about 25%-30% solids content. It is used in the following examples as described below.

Na$_2$O from about 1.75 to about 2.10% weight on a volatile-free basis;

Rare earth oxide (cerium, lanthanum expressed as ReO) from about 10 to about 13 weight %.

The exchanged zeolites described in Examples 1 and 2 were combined with ammonium polysilicate produced by the exchange of sodium silicate with an acidic exchange resin by a procedure, such as is described in the Shannon U.S. Pat. No. 3,083,167 and Hoffman U.S. Pat. No. 3,649,556. For the purposes of our invention, we prefer to employ the ammonium polysilicate produced by ammoniation of the effluent from the above resin exchange. Preferably, the produced product from the exchange of the sodium silicate with the acid resin is promptly made alkaline with ammonium hydroxide.

EXAMPLE 3

Four hundred grams, on a volatile-free basis of a pseudoboehmite of the preferred characteristics described above was peptized with 4.227 liters of water to which had been added 38 ml of 100% formic acid with moderate stirring for about 30 minutes. To this mixture was added 1,238 grams, on a volatile-free basis of ball clay and 400 grams of acid-treated halloysite referred to above, and the mixture was vigorously stirred for about 15 minutes. To the resultant mixture was added 463 grams, on a volatile-free basis, of the exchanged zeolite produced as in Example 1, with vigorous agitation. The mixture was spray dried at an inlet temperature of the flame of about 870° F. The outlet temperature of the combustion gases from the spray drier was 330° F. The air nozzle of the spray drier was at 25 psig pressure. The spray-drier feed was introduced at 21 psig pressure. Approximately 55% by weight of the finished spray-dried catalyst, collected as particles of 70 micron average diameter, determined by the above attrition index procedure on about 10 samples, showed a mean attrition index of about 45 with a 1 sigma of 14. The catalyst had a conversion by the above procedure as follows:

| ° F. | % Conversion |
|---|---|
| 1400(M) | 70 |
| 1500(S) | 60 |
| 1550(S+) | 20 |

The pore characteristics of the above catalysts were as follows:

| Pore Size Distribution in Pore Radius A | | | |
|---|---|---|---|
| | > | 300 | 7% |
| 200 | - | 300 | 5% |
| 100 | - | 200 | 15% |
| 50 | - | 100 | 26% |
| 30 | - | 50 | 27% |
| Surface Area, meters square per gram: 211 | | | |
| Pore Volume, milliliters per gram: 0.24 | | | |

The analysis of that product normalized on a volatile-free basis was as follows:

| SiO$_2$ | 51 Weight % |
|---|---|
| Al$_2$O$_3$ | 41 Weight % |
| ReO* | 2.33 Weight % |
| Fe$_2$O$_3$ | 0.71 Weight % |
| TiO$_2$ | 1.29 Weight % |
| Na$_2$O | 0.80 Weight % |
| SO$_3$ | 1.13 Weight % |
| V.M. | 15.4% |

*Rare Earth Oxides

EXAMPLE 4

A catalyst was formed using the procedure described in Example 3 having the following composition:

19% by weight of the zeolite produced according to Example 1 was combined with 18% by weight of the pseudoboehmite as described above in Example 3 and with 16% by weight of SiO$_2$ in the form of the above ammonia polysilicate containing 5.5% by weight of silica expressed as SiO$_2$, the ammonium silicate solution having a specific gravity of 1.045 grams per cubic centimeter. 16% of the ammonium polysilicate and 42% of ball clay, all percentages by weight on a volatile-free basis were added. The following procedure is illustrative.

405 grams, on a volatile-free basis, of the above pseudoboehmite were blended by the procedure described in connection with Example 3 with 3.568 liters of water containing 38 ml of formic acid for about 30 minutes under mild agitation. To this slurry, 427 grams, on a volatile-free basis, of the product produced according to Example 1 were blended with the above peptized pseudoboehmite under mild agitation.

To the resultant slurry was added a solution containing 360 grams of ammonium polysilicate calculated on a volatile-free basis, and the mixture was stirred for about 10 minutes under vigorous agitation. Following this agitation, 1,058 grams on a volatile-free basis of ball clay were added and mixed about 10 minutes with vigorous agitation; and the slurry was passed promptly to the spray drier under the conditions described in Example 3.

The resultant catalyst produced by spray drying had an average particle size of 70 micron diameter and a tap density of 0.80 grams per cc. The aforesaid catalyst had the following attrition index:

A mean of 19.6% attrition index with a 1 sigma spread of 5 (12 samples); i.e., 90% of the samples had a value in the range of 22 to 17 attrition index.

The pore size radii distribution surface area and pore volume are as follows:

| Pore Size Radii Distribution | | | | |
|---|---|---|---|---|
| | > | 300 A | = | 10% |
| 200 | - | 300 A | = | 6% |
| 100 | - | 200 A | = | 19% |
| 50 | - | 100 A | = | 34% |
| 30 | - | 50 A | = | 16% |
| | < | 30 A | = | 15% |

Surface Area Meters Square Per Gram: — 206
Pore Volume Milliters Per Gram: — 0.48

The activity-stability profile of catalyst according to Example 4 is illustrated by the following, employing the above list:

| Conversion, Vol. % | 1450° F. | 74 |
|---|---|---|
| | 1500° F. | 64 |
| | 1550° F. | 26 |

A typical chemical composition, expressed as weight percent of a catalyst formed according to Example 4, on a volatile-free basis is as follows:

| | |
|---|---|
| $SiO_2$ | 53.7 Weight % |
| $Al_2O_3$ | 40.4 Weight % |
| ReO* | 3.1 Weight % |
| $Na_2O$ | 0.9 Weight % |
| $NH_3$ | 0.5 Weight % |
| $TiO_2$ | 0.5 Weight % |
| FeO | 0.5 Weight % |
| $SO_3$ | 1.6 Weight % |

*ReO is rare earth oxides as in Example 1.

EXAMPLE 5

The catalyst was formulated as in Example 4 except that no ammonium polysilicate was employed.

Such catalysts have the following composition and properties:

| | | |
|---|---|---|
| $SiO_2$ | 49.2% | by weight on a volatile-free basis |
| $Al_2O_3$ | 41.8% | by weight on a volatile-free basis |
| ReO* | 6.74% | by weight on a volatile-free basis |
| $Na_2O$ | 0.45% | by weight on a volatile-free basis |
| $NH_3$ | 0.34% | by weight on a volatile-free basis |
| $TiO_2$ | 0.80% | by weight on a volatile-free basis |
| $Fe_2O_3$ | 0.48% | by weight on a volatile-free basis |
| $SO_3$ | 0.02% | by weight on a volatile-free basis |

*Rare earth oxides as in Example 1.

| | |
|---|---|
| Activity 1450° F. | 73.4 |
| Activity 1500° F. | 65.4 |
| Activity 1550° F. | 23.2 |
| Attrition Index | 43 |
| Surface Area | 208 square meters per gram |
| Pore Volume | 0.35 ml per gram |
| Average Particle Diameter | 71 microns |
| Tap Bulk Density | 0.91 grams per ml |

EXAMPLE 6

A catalyst composition was prepared using the same procedure and percent by weight of components as reported in Example 4; but instead of the product of Example 1, the product of Example 2 is employed.

A typical analysis of such a catalyst on a volatile-free basis is as follows:

| | |
|---|---|
| $SiO_2$ | 51.42 wt. % |
| $Al_2O_3$ | 40.47 wt. % |
| ReO | 4.20 wt. % |
| $Na_2O$ | 0.35 wt. % |
| $NH_3$ | 0.62 wt. % |
| $TiO_2$ | 0.61 wt. % |
| $Fe_2O_3$ | 0.62 wt. % |
| $SO_3$ | 1.72 wt. % |

EXAMPLE 7

A catalyst was formulated as in Example 4 employing instead of the ammonium polysilicate a colloidal silica sol containing 15% $SiO_2$ in the same relative amount as in Example 4. The sol is sodium stabilized, sold by Nalco Chemical Corporation, and reported by them to have an average particle size of 4 millimicrons. It had a $p_H$ of 10.4 and a $Na_2O$ content of 0.80%. The $Na_2O$ content based on the zeolite component is 0.97% of the exchanged zeolite of Example 1. Its attrition index and activity are given in Table I below.

EXAMPLE 8

A catalyst was produced as in Example 6 using a colloidal silica sol to introduce the same relative amount of $SiO_2$ as in Examples 6 and 4. The sol is ammonium stabilized, sold by Nalco Chemical Company, and reported by them to have an average particle size of 5 millimicrons. The silica sol has a $p_H$ of 9 and $Na_2O$ content of less than 0.01% $Na_2O$. The attrition index and activity are given in Table I below.

EXAMPLE 9

A catalyst was formulated as in Example 4 employing, instead of the ammonium polysilicate, a colloidal silica sol of $p_H$ 10 containing 30% $SiO_2$ containing 0.40% $Na_2O$ based on the slurry to introduce $SiO_2$ in the same relative amount as in Example 4. The sol is a product sold by Nalco Chemical Company and reported by them to have an average particle size of 13 millimicrons. The $Na_2O$ content based on the zeolite is increased to 5.65%. Its attrition index is given in Table I below.

EXAMPLE 10

A catalyst was produced as in Example 6, using a colloidal silica sol of $p_H$ 3.2 containing 0.05% $Na_2O$ to introduce the same relative amount of $SiO_2$ as in Examples 6 and 4. The sol is sold by Nalco Chemical Company and reported by them to have an average particle size of 20 millimicrons. The attrition index is given in Table I below.

The following table gives typical Attrition Index and Activity Profile of the catalysts produced as compared to the properties of the catalyst of Examples 3 and 5:

TABLE I

| Sample | Particle Size Millimicrons | Attrition Index | 1 Sigma | Activity % 1450° | Activity % 1500° | Activity % 1550° |
|---|---|---|---|---|---|---|
| Example 3 | None | 45 | 14 | 70 | 60 | 20 |
| Example 4 | Ionic | 19.6 | 5 | 70 | 64 | 26 |
| Example 5 | None | 43 | | 73 | 65 | 23 |
| Example 6 | Ionic | 21 | 3.5 | 80 | 65 | 55 |
| Example 7 | 4 | 21 | | 56 | 28 | 13 |
| Example 8 | 5 | 28 | | 72 | 51 | 22 |
| Example 9 | 13 | 35 | | | | |
| Example 10 | 20 | 76 | | | | |

Comparing Example 3 with Example 4 and Example 5 with Example 6, it will be seen that there is not only a large increase in abrasion resistance but also in the reproducibility of the abrasion resistance. Thus, the spread in Example 4 of 90% of the population tested was 5 index percent points or less. Compare this to Examples 3 and 5. It is also significant that while the 4 millimicron size sodium-stabilized colloidal sol also gave a reasonably good abrasion resistance it caused a substantial depreciation in steam stability. It is significant also to note that the substitution of ammonia stabilization of the 5 millimicron particle colloidal sol, while it did not depreciate the steam stability of the catalyst activity it did not improve the attrition index as much as did the ionic polysilicate. The effect of the molecular weight of the polysilicate colloid is seen in comparing the results of Examples 9 and 10 with the other examples of Table I.

As will appear from the above use of an ionic ammonium polysilicate in a precursor mixture with an exchanged zeolite, hydrated alumina, preferably pseudoboehmite, and kaolin clay will produce a spray-dried catalyst of superior attrition resistance of about 20% or less when tested by the above test procedure and the addition of the ammonium polysilicate to the above catalyst will not depreciate but, in fact, substantially improve its catalytic activity and steam stability as will be seen when Examples 3 and 5 are compared with Examples 4 and 6 respectively.

A comparison of the pore volumes and the pore sizes of the spray-dried samples of Examples 3 and 4 shows that there is a concentration of pore volume in the 50 to 200 Angstrom range and a substantial increase in total pore volume as a result of the addition of the ammonium polysilicate (see Table II).

TABLE II

| Example | % of Pores of Radius in the 50–200 Angstrom Range | Pore Volume ml/gm |
|---|---|---|
| 3 | 41% | 0.24 |
| 4 | 61% | 0.48 |

We claim:

1. A water slurry consisting essentially of a mixture of a zeolite of the faujasite type having a Na content, expressed as $Na_2O_3$, of less than about 5% by weight of the zeolite, a kaolin clay, alumina in the form of pseudoboehmite and ammonium polysilicate.

2. The slurry of claim 1 in which the weight ratio of the components is about 10 parts to about 30 parts of the zeolite, about 13 parts to about 20 parts of the polysilicate expressed as $SiO_2$, about 20 parts to about 50 parts of kaolin, about 10 parts to about 30 parts of pseudoboehmite expressed as $Al_2O_3$, all of the foregoing totaling 100 parts.

3. The slurry of claim 1 in which the ammonium polysilicate is an ionic solution in which the ratio of the moles of $NH_4$ to the moles of $SiO_2$ in the polysilicate ion is in the range of about 4 to about 14.

4. The slurry of claim 2 in which the ammonium polysilicate is an ionic solution in which the ratio of the moles of $NH_4$ to the moles of $SiO_2$ in the polysilicate ion is in the range of about 4 to about 14.

5. A spray-dried cracking catalyst produced by spray drying a water slurry of a mixture of a zeolite of the faujasite type having a Na content, expressed as $Na_2O$, of less than about 5% by weight of the zeolite, a kaolin clay, pseudoboehmite and ammonium polysilicate.

6. The catalyst of claim 5 in which the weight ratio of the components in the slurry is about 10 parts to about 30 parts of the zeolite, about 13 parts to about 20 parts of the polysilicate expressed as $SiO_2$, about 20 parts to about 50 parts of kaolin, about 10 parts to about 30 parts of alumina expressed as $Al_2O_3$, all of the foregoing totaling 100 parts.

7. The catalyst of claim 5 in which the ammonium polysilicate in the slurry is an ionic solution in which the ratio of the moles of $NH_4$ to the moles of $SiO_2$ in the polysilicate ion is in the range of about 4 to about 14.

8. The catalyst of claim 6 in which the ammonium polysilicate in the slurry is an ionic solution in which the ratio of the moles $NH_4$ to the moles $SiO_2$ in the polysilicate ion is in the range of about 4 to about 14.

9. The catalyst of claim 5 in which the attrition index 1 sigma value is less than about 5.

10. The catalyst of claim 5 in which the volume of the pores in the range of about 50 to about 200 Angstrom is in excess of about 50% of the total pore volume.

11. The catalyst of claim 10 in which the attrition index 1 sigma value is less than about 5.